US008643700B2

(12) United States Patent
Shows et al.

(10) Patent No.: US 8,643,700 B2
(45) Date of Patent: Feb. 4, 2014

(54) 3D CONTENT ADJUSTMENT SYSTEM

(75) Inventors: Thomas Alexander Shows, Leander, TX (US); Brian Todd Zucker, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 391 days.

(21) Appl. No.: 12/948,536

(22) Filed: Nov. 17, 2010

(65) Prior Publication Data

US 2012/0120195 A1 May 17, 2012

(51) Int. Cl.
*G02B 27/00* (2006.01)
*G02B 27/01* (2006.01)

(52) U.S. Cl.
USPC .................................. 348/46; 348/51; 345/6

(58) Field of Classification Search
None
See application file for complete search history.

(56) References Cited

U.S. PATENT DOCUMENTS

| | | | | |
|---|---|---|---|---|
| 7,150,531 | B2 * | 12/2006 | Toeppen | 353/7 |
| 7,428,001 | B2 * | 9/2008 | Schowengerdt et al. | 348/51 |
| 7,440,004 | B2 * | 10/2008 | Siegel et al. | 348/47 |
| 7,468,778 | B2 * | 12/2008 | Thomas et al. | 352/85 |
| 7,612,795 | B2 * | 11/2009 | Provitola | 348/42 |
| 2008/0117289 | A1 * | 5/2008 | Schowengerdt et al. | 348/46 |
| 2009/0102915 | A1 * | 4/2009 | Arsenich | 348/53 |
| 2009/0244267 | A1 * | 10/2009 | Yuan et al. | 348/51 |

OTHER PUBLICATIONS

Schowengerdt et al, "Binocular Retinal Scanning Laser Display with Integrated Focus Cues for Ocular Accommodation", Proc. of SPIE/IS&T Electronic Imaging, SPIE vol. 5006, 2003.*
Schowengerdt et al, "Binocular retinal scanning laser display with integrated focus cues for ocular accommodation," Proc. SPIE/IS&T Electronic Imaging, SPIE, vol. 5006, 2003.*
Carolina Cruz-Neira, Daniel J. Sandin and Thomas A. Defanti; "Surround-Screen Projection-Based Virtual Reality: The Design and Implementation of the CAVE;" pp. 135-142; Electronic Visualization Laboratory (EVL), The University of Illinois at Chicago.
Yong-Sheng Chen, Chan-Hung Su, Jiun-Hung Chen, Chu-Song Chen, Yi-Ping Hung and Chiou-Shann Fuh; "Video-Based Realtime Eye Tracking Technique for Autostereoscopic Displays;" Nov. 2000, pp. 188-193; In Proceedings Of The Fifth Conference on Artificial Intelligence and Applications; Taipei, Taiwan.
Yong-Sheng Chen, Chan-Hung Su, Jiun-Hung Chen, Chu-Song Chen, Yi-Ping Hung and Chiou-Shann Fuh; "Video-Based Eye Tracking for Autostereoscopic Displays;" pp. 1-22; Jun. 20, 2001; Optical Engineering.
Brian C. Daugherty, Andrew T. Duchowski, Donald H. House and Celambarasan Ramasamy; "Measuring Vergence Over Stereoscopic Video With a Remote Eye Tracker;" pp. 97- 100; Mar. 22-24, 2010; School of Computing & Digital Production Arts, Clemson University.

* cited by examiner

*Primary Examiner* — Jayanti K Patel
*Assistant Examiner* — Reza Aghevli
(74) *Attorney, Agent, or Firm* — Haynes and Boone, LLP

(57) ABSTRACT

A 3D content adjustment system includes a processor. A camera is coupled to the processor. A non-transitory, computer-readable medium is coupled to the processor and the camera. The computer-readable medium includes a content adjustment engine including instructions that when executed by the processor receive viewer information from the camera, modify a plurality of original stereoscopic images using the viewer information to create a plurality of modified stereoscopic images, and output the plurality of modified stereoscopic images.

18 Claims, 7 Drawing Sheets

3D CONTENT ADJUSTMENT SYSTEM

BACKGROUND

The present disclosure relates generally to three dimensional (3D) content, and more particularly to a 3D content adjustment system for use when viewing 3D content.

3D entertainment includes the use of techniques that 'fool' or 'trick' a persons brain into interpreting three dimensions from images presented on a two dimensional (2D) screen. The most common technique is the presentation of slightly different images (i.e., the components of a stereoscopic image) to each eye. The slight differences between the left eye image and the right eye image causes the eyes to track the objects in the image by vergence, or the simultaneous movement of both eyes in opposite directions to obtain or maintain single binocular vision. However, the eyes also process distance by accommodation, where the eyes change their optical power to keep a target viewed object in focus. In the natural world, the brain signals from vergence and accommodation agree. But when viewing, for example, 3D video content, vergence and accommodation can conflict and lead to eye strain, fatigue, headaches, dizziness, and similar problems. This is because when the stereoscopic images are presented on a 2D screen, the focal distance for the eyes (viewed by accommodation) is generally fixed, while the vergence of the eyes varies with the content being displayed (e.g., as objects are "pushed" out of the screen toward the viewer or moved away from the viewer and further into the screen.)

The conflict of vergence/accommodation may be minimized during the creation of 3D video content when the amount of depth the 3D video content creators strive to provide to the viewers is set for a theater environment where the viewers sit relatively far from the screen. However, when this 3D video content is converted for home theater environments, 3D video content creators make certain assumptions about the viewers (e.g., average focal distance and interocular distance) and those assumptions are then used as fixed parameters that determine how the stereoscopic images are presented to the viewers. Because viewing conditions may vary greatly in home environments, viewers may find that 3D video content enjoyed in a theater environment may end up resulting in discomfort, eyestrain, headaches, and other negative effects when viewed in a home environment.

Accordingly, it would be desirable to provide improved system to present 3D content.

SUMMARY

According to one embodiment, a 3D content adjustment system includes a processor, a camera coupled to the processor; and a non-transitory, computer-readable medium coupled to the processor and the camera, wherein the computer-readable medium includes a content adjustment engine comprising instructions that when executed by the processor receive viewer information from the camera, modify a plurality of original stereoscopic images using the viewer information to create a plurality of modified stereoscopic images, and output the plurality of modified stereoscopic images.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
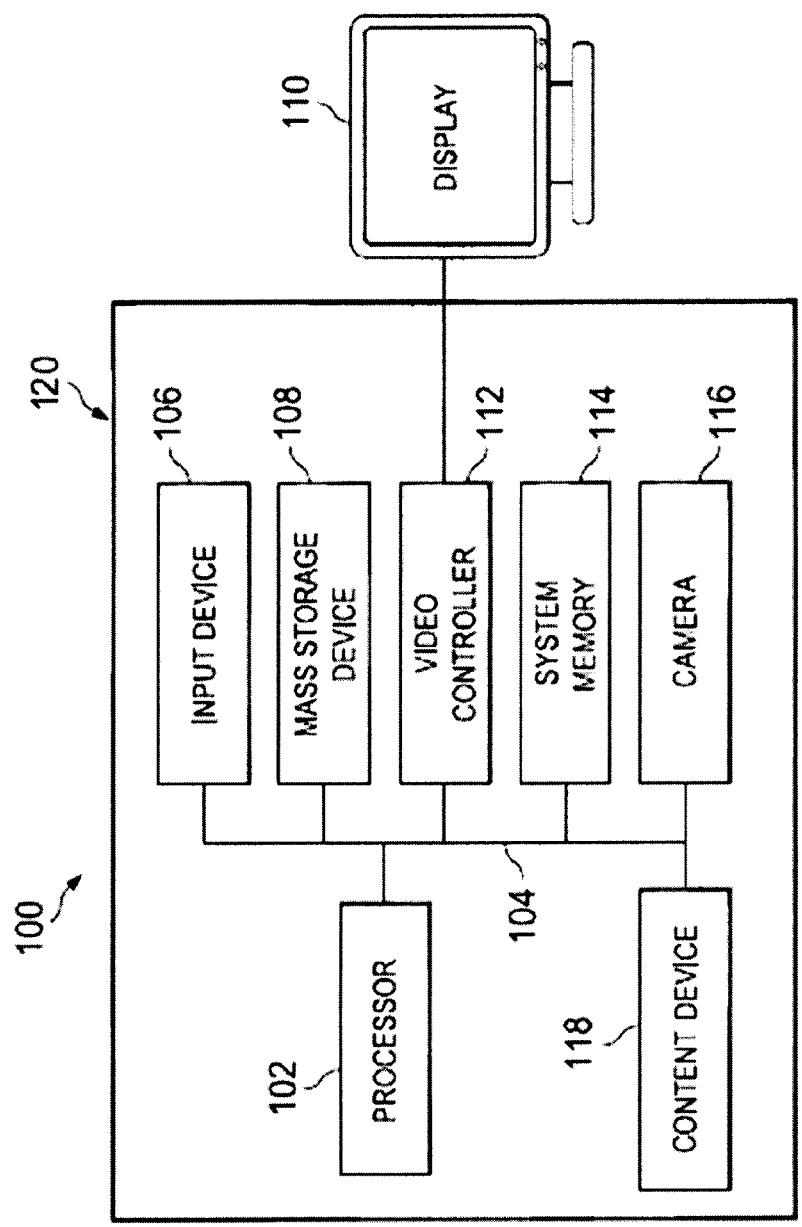
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. It should be understood that other buses and intermediate circuits can be deployed between the components described below and processor 102 to facilitate interconnection between the components and the processor 102. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. The mass storage device 108 and/or the system memory 114 are examples of non-transitory, computer-readable mediums that are included in the IHS 100. However, a variety of other computer-readable mediums known in the art may be located in or coupled to the IHS 100.

A camera 116 is coupled to the processor 102 to provide one or more images and/or image data to the processor 102 and/or engines coupled to the processor 102, as discussed in further detail below. In an embodiment, the camera 116 is operable to determine distances between the camera and objects in the visible field of the camera, distances between objects in the visible field of the camera, and a variety of other distance information known in the art. For example, the camera 116 may be a depth camera available from Canesta (www.canesta.com), Optrima (www.optrima.com), and/or Prime Sense (www.primesense.com), a color-based camera, and/or a variety of other cameras known in the art that are operable to determine the same or similar information. In an embodiment, the camera 116 is operable to track a plurality of objects in the visible field of the camera 116 at a minimum of 30 updates/second. In an embodiment, the camera 116 is operable to determine a distance to an object in the visible field of the camera 116 within a range of error of +/−10 centimeters. In an embodiment, the camera 116 is operable to determine a distance between objects in the visible field of the camera 116 within a range of error of +/−1 centimeters. In an embodiment, the camera 116 may be operable in the visible light spectrum, the infrared spectrum, and/or a variety of other lighting situations known in the art. In an embodiment, the camera 116 has facial recognition capabilities.

A content device 118 is coupled to the processor 102 and operable to play content and provide that content to the processor 102 and/or engines coupled to the processor 102, as discussed in further detail below. In an embodiment, a chassis 120 houses some or all of the components of the IHS 100. In an embodiment, the content device 118 may be, for example, an optical disk player (e.g., a 3D Blu-Ray DVD player), a digital media player (e.g., a "set-top" box from a television service provider), and/or a variety of other content devices that are operable to play 3D content. For example, the chassis 120 may be a desktop or laptop computer chassis that houses a content device 118 (e.g., an optical disk player or digital media player) and is coupled to the display 110 that is operable to display 3D content. In another embodiment, the processor 102 and camera 116 may be part of the display 110 that is operable to display 3D content, and the content device 118 (e.g., an optical disk player or digital media player) is coupled to the display 110. In an embodiment, the processor 102, camera 116, and computer-readable medium may be part of one or more hardware devices that are separate from and coupled to the content device 118 and the display 110. While specific examples of the components of the IHS 100 have been described (e.g., a computer attached to a monitor, a Blu-Ray player attached to a display, a set-top box attached to a display, etc.), one of skill in the art will recognize that these examples should not limit the present disclosure, and a variety of different configurations other than those described fall with the scope of the present disclosure.

Figure 2:
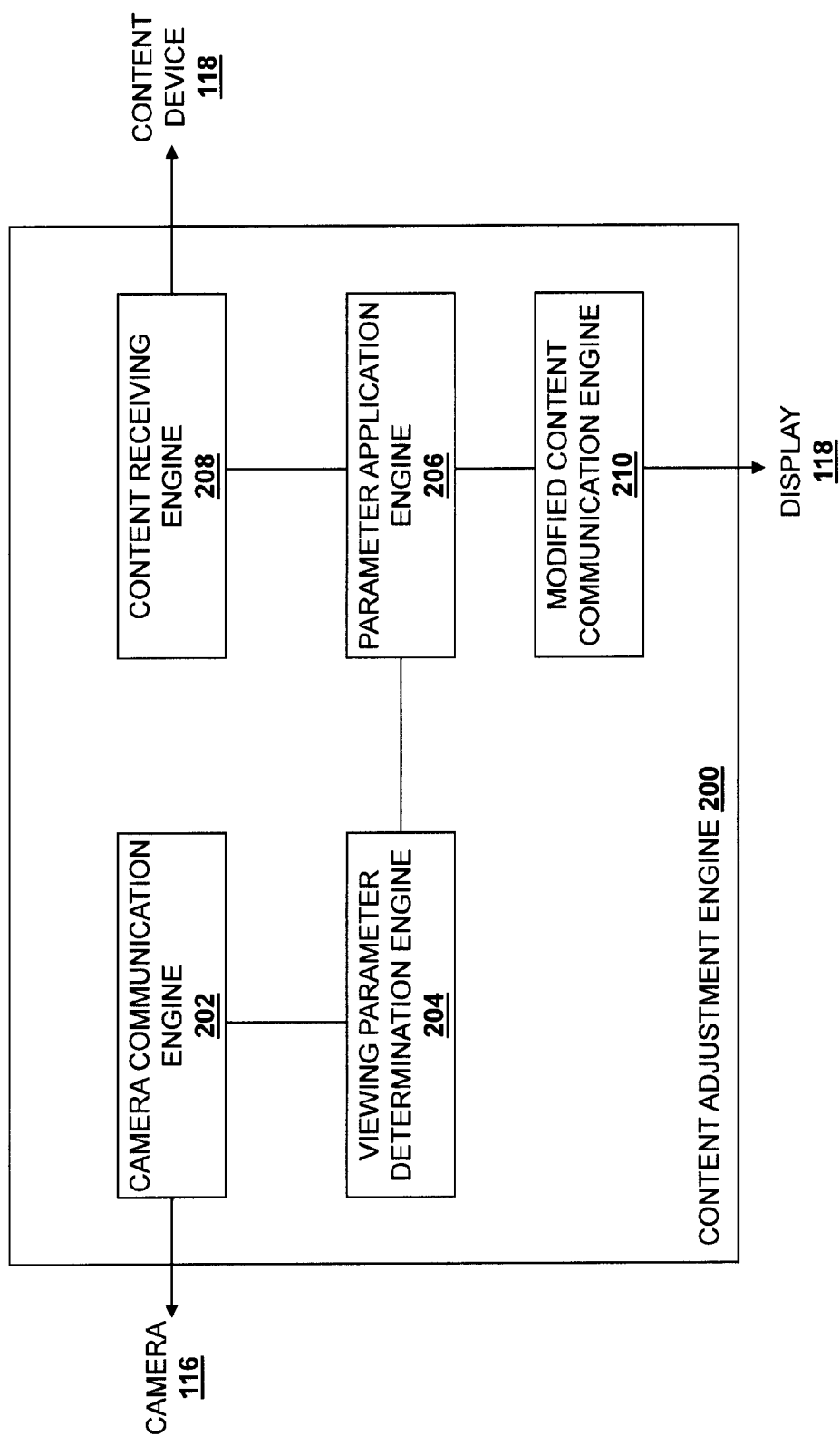
FIG. 2 is a schematic view illustrating an embodiment of a content adjustment engine that is used with the information handling system of FIG. 1.

Referring now to FIG. 2, a content adjustment engine 200 is illustrated. In an embodiment, the content adjustment engine 200 (and/or one or more of the components of the content adjustment engine 200, discussed below) includes instructions that are included on the IHS 100, discussed above with reference to FIG. 1, such as, for example, on a non-transitory computer-readable medium such as the mass storage device 108, the system memory 114, and/or a variety of other computer-readable mediums known in the art. As is known in the art, instructions included in the content adjustment engine 200 may be executed by a processor (e.g., the processor 102, described above with reference to FIG. 1) to perform one or more actions. The content adjustment engine 200 includes a camera communication engine 202 that is coupled to the camera 116 to receive data from the camera 116. A viewing parameter determination engine 204 is coupled to the camera communication engine 202 to receive the data received from the camera 116 and manipulate the data to determine at least one parameter. A parameter application engine 206 is coupled to a content receiving engine 208 to receive content from the content device 118, and to the viewing parameter determination engine 204 to receive the at least one parameter from the viewing parameter determination engine 204 and use the at least one parameter to modify the content received from the content device 118. A modified content communication engine 210 is coupled to the parameter application engine 206 to receive the modified content from the parameter application engine 206 and transmit the modified content to the display 118. The content adjustment engine 200 may include instructions on a single computer-readable medium or a plurality of computer readable mediums, and may be included in one or more pieces of hardware.

Referring now to FIGS. 2, 3a, 3b, 3c, and 3d, a method 300 for providing 3D content is illustrated. The method 300 is illustrated and described below as carried out in a home theater (e.g., on a television set in a home) with 5 viewers (e.g., 3 adults and 2 children in the illustrated embodiment.) However, one of skill in the art will recognize that the method 300 is not so limited, and may be carried out on a variety of display devices in a variety of locations with one or more viewers. The method 300 begins at block 302 where viewer information is received from a camera. In the illustrated embodiment, a plurality of viewers 302a, 302b, 302c, 302d, and 302e are located adjacent the display 110 and in the visible field of the camera 116. Each of the plurality of viewers 302a, 302b, 302c, 302d, and 302e includes a pair of eyes 302aa, 302ba, 302ca, 302da, and 302ea, respectively. For example, the plurality of viewers may include child viewers 302a and 302b and adult viewers 302c, 302d, and 302e. In an embodiment, the eyes of the plurality of viewers may be located at different distances from a floor 302f such as, for example, with the 302aa and 302ba of the child viewers 302a and 302b, respectively, located closer to the floor 302f than the eyes 302ca, 302da, and 302ea of the adult viewers 302c, 302d, and 302e (e.g., because the adult viewers are sitting on a couch while the child viewers are sitting on the floor 302f.)

Figure 3A:
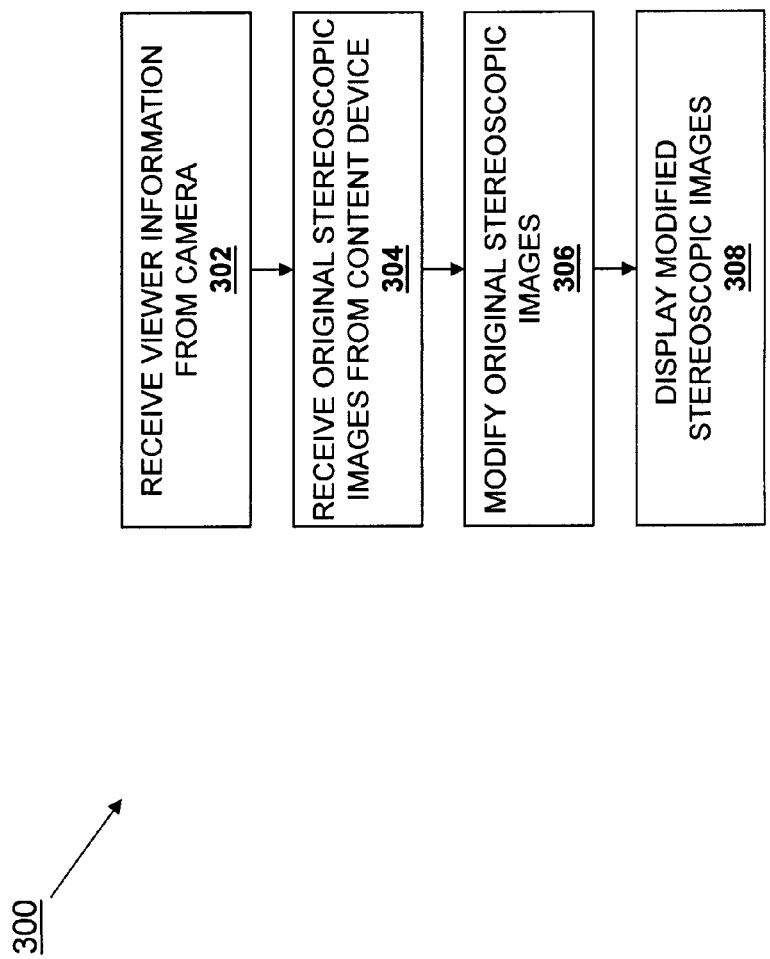
FIG. 3a is a flow chart illustrating an embodiment of a method for providing 3D content.
Figure 3B:
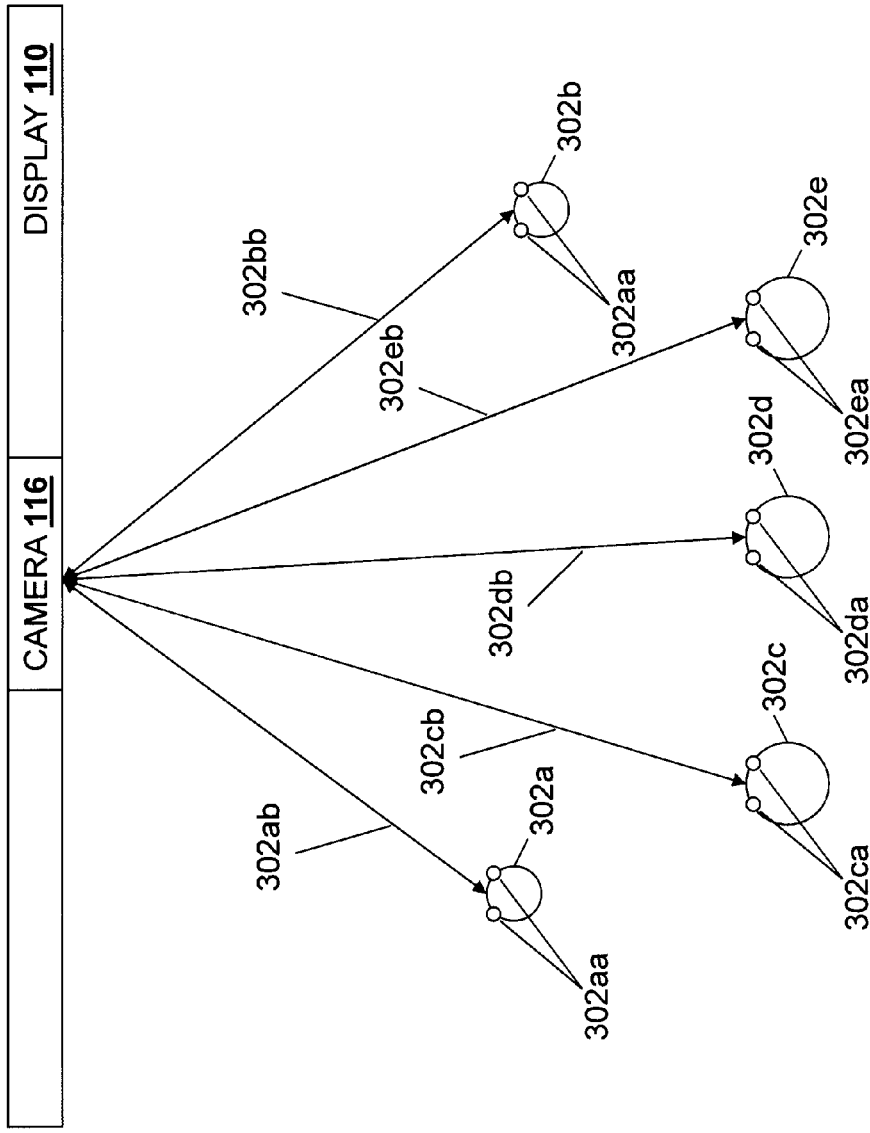
FIG. 3b is a schematic view illustrating an embodiment of a plurality of viewers located adjacent a display and a viewer distance for each viewer being determined by a camera.
Figure 3C:
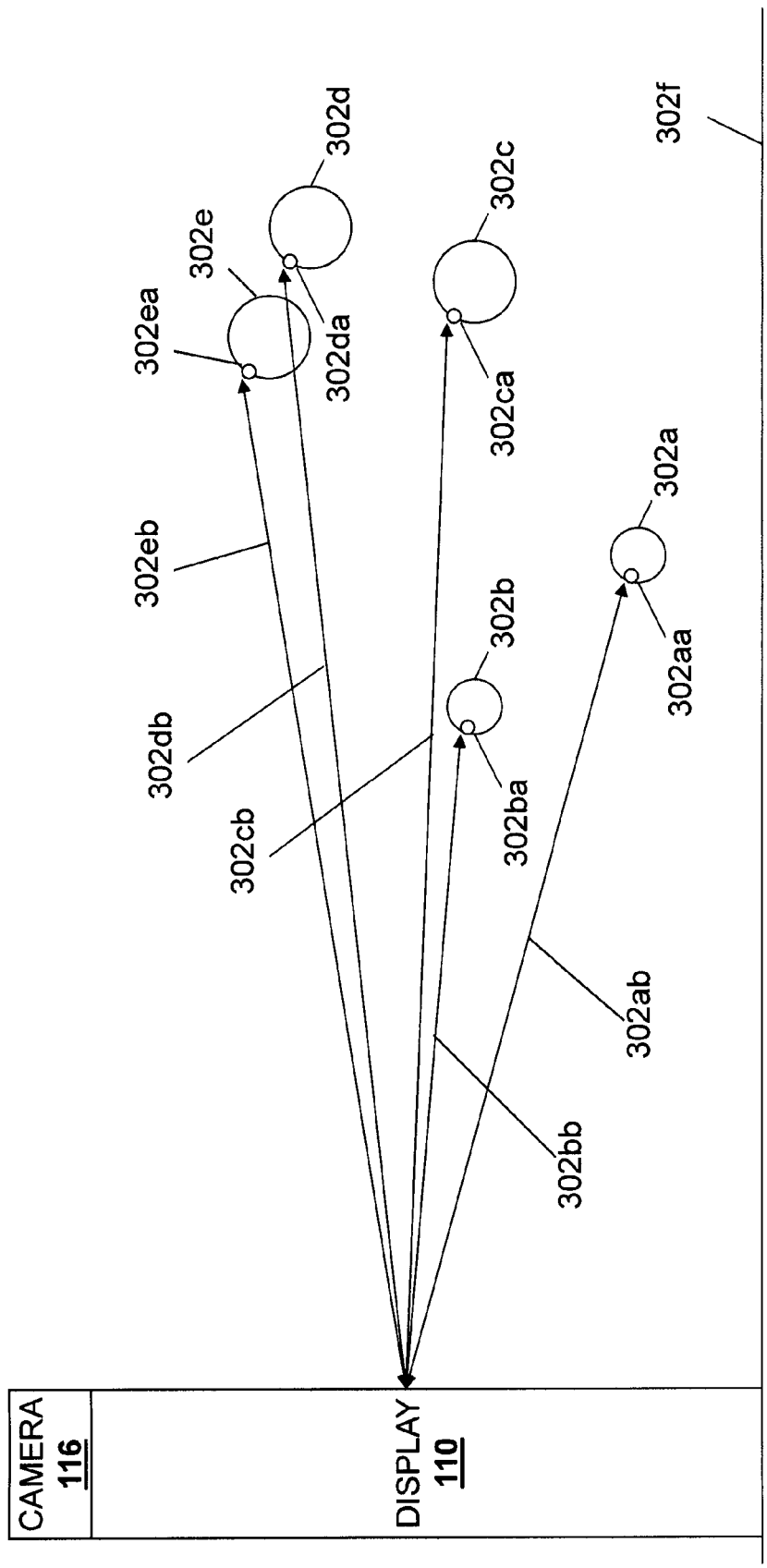
FIG. 3c is a schematic view illustrating an embodiment of a plurality of viewers located adjacent a display and a viewer distance for each viewer being determined by a camera.

In the illustrated embodiment, the camera 116 is located atop the display 110 and opposite the floor 302f from the display 110. However, the camera 116 may be intergrated into the display 110, located in a component that is coupled to the display 110, or oriented in a variety of other locations relative to the display 110 without departing from the scope of the present disclosure. The camera 116 is operable to detect each of the viewers 302a, 302b, 302c, 302d, and 302e in its visible field using, for example, facial recognition technology and/or other object detection technologies known in the art. In an embodiment, for each viewer detected, the camera 116 is operable to determine a viewer distance. In an embodiment, the viewer distance for each viewer may be the distance from the camera 116 to the viewers face, eyes, or other point or points on the viewers face or body. For example, a viewer distance 302ab, 302bb, 302cb, 302db, and 302eb may be determined for the viewers 302a, 302b, 302c, 302d, and 302e, respectively. In one embodiment, the viewer distances may be measured as the distance between the camera 116 and the chosen point or points on the viewers face or body. In another embodiment, the viewer distances may be measured as the distance between a point or points that are spaced apart from the camera 116 and the chosen point or points on the viewers face or body (e.g., between the middle of the display 110 and the chosen point or points on the viewers face or body, as illustrated in FIG. 3c.) This may be accomplished by, for example, determining the distance between the camera 116 and the point or points on the viewers face or body, and then using a known or determined distance between the camera 116 and the point or points that are spaced apart from the camera 116 to calculate a distance from the point or points that are spaced apart from the camera 116 and the chosen point or points on the viewers face or body. In an embodiment, the camera 116 is operable to determine the direction any given viewer is looking by, for example, using facial recognition technology, in order to increase the accuracy of the viewer distance determination.

In an embodiment, the determination of the viewer distance for each viewer may be a determination or approximation of the focal distance for the eyes of each viewer. Thus, a variety of distances between the camera (or points spaced apart from the camera) and the point or points on the viewers face or body may be used while remaining within the scope of the present disclosure. In an embodiment, the camera 116 is of sufficient resolution and sensitivity to determine the viewer distance for each viewer within a range of error of +/−10 centimeters.

In an embodiment, for each viewer detected, the camera 116 is operable to determine a viewer interocular measurement. In an embodiment, the viewer interocular measurement for each viewer may be the distance between the eyes of each viewer. For example, a viewer interocular measurement 302*ac*, 302*bc*, 302*cc*, 302*dc*, and 302*ec* may be determined for the viewers 302*a*, 302*b*, 302*c*, 302*d*, and 302*e*, respectively. In an embodiment, the determination of the viewer interocular measurement for each viewer may be a determination or approximation of the interocular distance between the eyes of each viewer. In an embodiment, the camera 116 is of sufficient resolution and sensitivity to determine the viewer interocular measurement for each viewer within a range of error of +/−1 centimeters. In an embodiment, the camera 116 is operable to determine the direction any given viewer is looking by, for example, using facial recognition technology, in order to increase the accuracy of the viewer interocular measurement determination.

In an embodiment, the camera 116 is operable to track a minimum of six viewers (e.g., using facial recognition technology) and determine a viewer distance and viewer interocular measurement for each viewer. In an embodiment, the camera 116 computes the viewer distance and viewer interocular measurement for each viewer in hardware. In an embodiment, the camera 116 is operable to track each viewer in the visible field of the camera 116 and provide updates of the viewer distances and/or viewer interocular measurements for each viewer at a minimum of 30 updates per second. While the determination of a viewer distance and viewer interocular measurement for each viewer in the visible field of the camera has been described in detail, one of skill in the art will recognize that other distances and measurements about the viewers, viewing environment, etc. may be determined by the camera 116 and used by the content adjustment system 200 without departing from the scope of the present disclosure.

The viewer information determined by the camera 116 is received by the camera communication engine 202, which is operable to communication with the camera 116 and receive and transmit the viewer information and/or other data. The viewing parameter determination engine 204 then receives the viewer information and/or other data and, in an embodiment, determines an average or averages of the viewer information. For example, the viewing parameter determination engine 204 may determine an average viewer distance from the plurality of viewer distances 302*ab*, 302*bb*, 302*cb*, 302*db*, and 302*eb* and/or an average viewer interocular measurement from the plurality of viewer interocular measurements 302*ac*, 302*bc*, 302*cc*, 302*dc*, and 302*ec*. In an embodiment, the average of the viewer information may include a mean, median, mode, and/or other averaging calculations known in the art. In an embodiment, the average or averages of the viewer information is used by the viewing parameter determination engine 204 to create a Phantom Mean Viewer (PMV). In embodiment, the PMV is a hypothetical viewer that is located adjacent the display 110 the average viewer distance from the camera 116 or the point or points that are spaced apart from the camera 116, and/or that includes the average viewer interocular measurement. In an embodiment, the viewing parameter determination engine 204 uses an interpolated average of the viewer information to create a curve that defines the PMV. For example, interpolation techniques such as linear interpolation, spline interpolation, and/or a variety of other interpolation techniques known in the art may be used on the viewer information to create the PMV curve. In an embodiment, the input frequency of the viewer information to create the PMV curve is a minimum 60 frames per second, which may be analyzed by splitting the updates between the number of viewers in the visible field of the camera 116 to save processor power (e.g., if the input frequency is the minimum of 60 frames per second, there may be 12 updates per second per viewer for the five viewers in the illustrated embodiment such that any one update only requires the processor or processors to determine viewer information for a single viewer) or be analyzed for every viewer (e.g., so that there are 60 updates per second per viewer for the five viewers in the illustrated embodiment, which is more processor intensive as it requires the processor or processors to determine viewer information for every viewer in each update.) Depending on processor speed and availability, use of the viewer information to determine the PMV curve may be performed such that the most current viewer information for each viewer is used to create the PMV curve. For example, only viewer information for a single viewer (or less than the total number of viewers in the visible field of the camera 116) may be determined for each update if the determination of viewer information for every viewer in each update takes an amount of time that results in at least some of the viewer information being inaccurate (i.e., if some a viewer distance in an update will be determined a period of time after the update was received such that the viewer to which that viewer distance relates has moved and that viewer distance is no longer accurate with respect to the viewer.)

The method 300 then proceeds to block 304 where original stereoscopic images are received from a content device. In an embodiment, the content receiving engine 208 receives 3D content from the content device 118 that includes a plurality of original stereoscopic images and may include other data. For example, the 3D content may be received from a 3D optical disk device (e.g., a Blu-Ray player), digital media player (e.g., a television provider set top box), and/or a variety of other content devices known in the art. In an embodiment, the each original stereoscopic image includes an original left eye image and an original right eye image, and the other data included in the 3D content from the content device 118 may include data on the pixel sizes of the original left eye image and the original right eye image, the interaxial distance or distances between the original left eye image and the original right eye image, and/or a variety of other 3D content data known in the art. In an embodiment, the 3D content is provided from the content device 118 at 24 frames per second per eye, and then may be upconverted to a higher frame rate by the display 110. In an embodiment, the 3D content may be provided in frame-tripled stereoscopic format, with 2 images per stereoscopic frame at 24 frames per second with a 3 frame repeat. In an embodiment, the viewer information is provided from the camera 116, to the camera communication engine 202, and to the viewing parameter engine 204 at the same time as the 3D content is provided from the content device 118 to the content receiving engine 208.

The method 300 then proceeds to block 306 where the original stereoscopic images are modified. In an embodiment, the parameter application engine 206 receives the average or averages of the viewer information from the viewing parameter determination engine 204 and the 3D content from the content receiving engine 208, and uses the average or averages of the viewer information to modify the 3D content. For example, the parameter application engine 206 may use the average viewer distance and average viewer interocular measurement to modify the original stereoscopic images to create modified stereoscopic images. In an embodiment, the 3D content is modified by the parameter application engine 206 at the same time as the 3D content is received from the content device 118 using viewer information received from the camera 116 that is continuously updated as the 3D content is received. In an embodiment, the parameter application engine 206 may use values that lie on the interpolated PMV curve to modify the original stereoscopic images to create the modified stereoscopic images. The sampling frequency of the interpolated PMV curve may be a minimum of 144 frames per second to accommodate the 24 frames per second content being shown in frame-tripled stereoscopic format, with 2 images per stereoscopic frame at 24 frames per second with a 3 frame repeat (24×2×3=144). The use of the interpolated PMV curve may allow the content adjustment system 200 to modify the original stereoscopic images in a manner that is comfortable to the viewers while one or more of the viewers change position in the visible field of the camera 116. For example, the parameter application engine 206 may use a range of values that line on the interpolated PMV curve to modify the original stereoscopic images, and that range may be adjusted to prevent rapid depth changes in the modified stereoscopic images that could result from the content adjustment engine 200 in response to viewers moving around near or far from the camera 116, or entering and exiting the visible field of the camera 116. Other controls may be available to viewers to adjust the use of the PMV curve to regulate the depth changes in the modified stereoscopic images.

In an embodiment, the modification of the original stereoscopic images is performed by taking each original stereoscopic image that includes an original left eye image and an original right eye image and using the average viewer information (e.g., the average viewer distance and average viewer interocular measurement for the viewers in the visible field of the camera 116) to adjust the pixel sizes of each of the original left eye image and the original right eye image in order to create a modified left eye image and modified right eye image that provide a modified stereoscopic image in which the depth provided has been adjusted relative to the depth provided by the original stereoscopic image from which it was created. In an embodiment, the modification of the original stereoscopic images is performed by applying interaxial shifts between the original left eye image and an original right eye image. The algorithm used to modify the original left eye image and the original right eye image may include a hemispherical projection algorithm, a rectilinear algorithm, and/or a variety of other algorithms known in the art for resampling pixel values for the purposes of expanding or contracting the amount of depth provided by a stereoscopic image. Thus, binocular disparity adjustments are made to the original left eye image and the original right eye image of each original stereoscopic image in order to provide the modified left eye image and modified right eye image of each respective modified stereoscopic image.

Figure 3D:
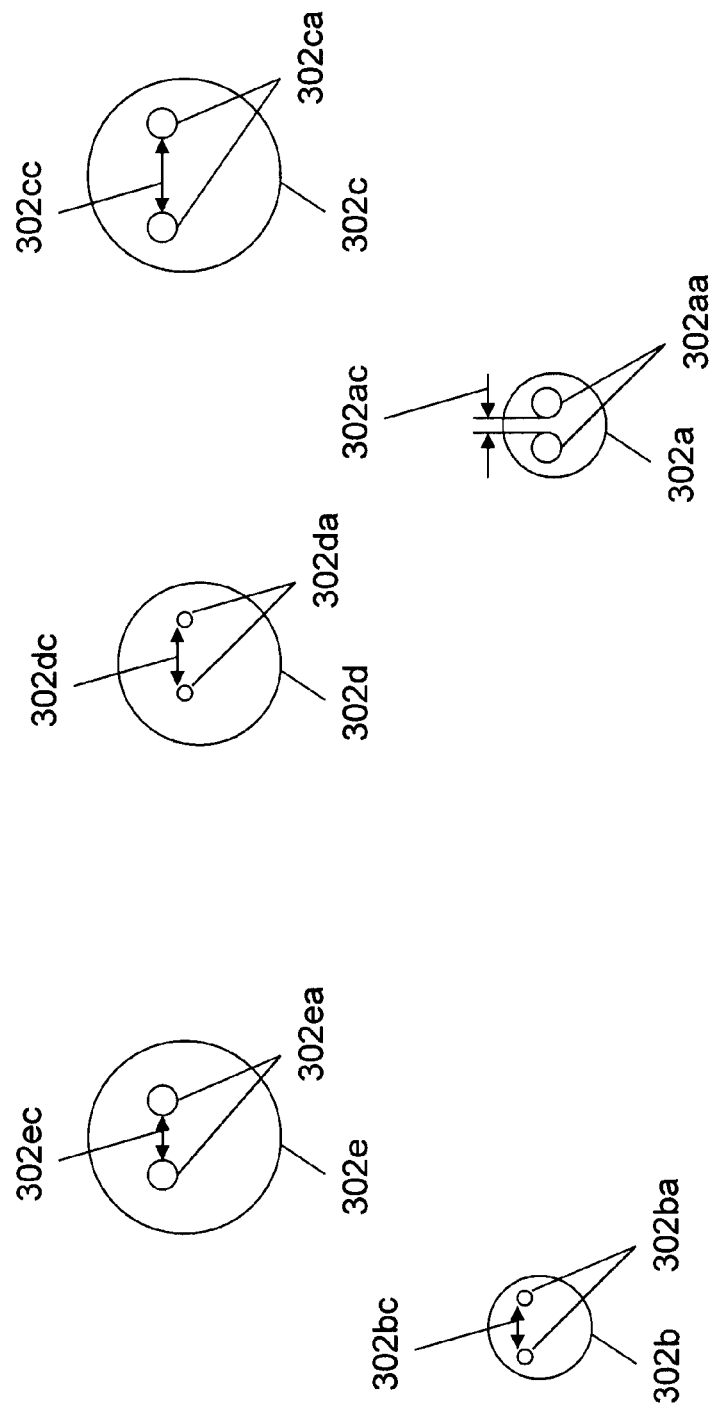
FIG. 3d is a schematic view illustrating an embodiment of a plurality of viewers and a viewer interocular measurement for each viewer being determined by a camera.
Figure 3E:
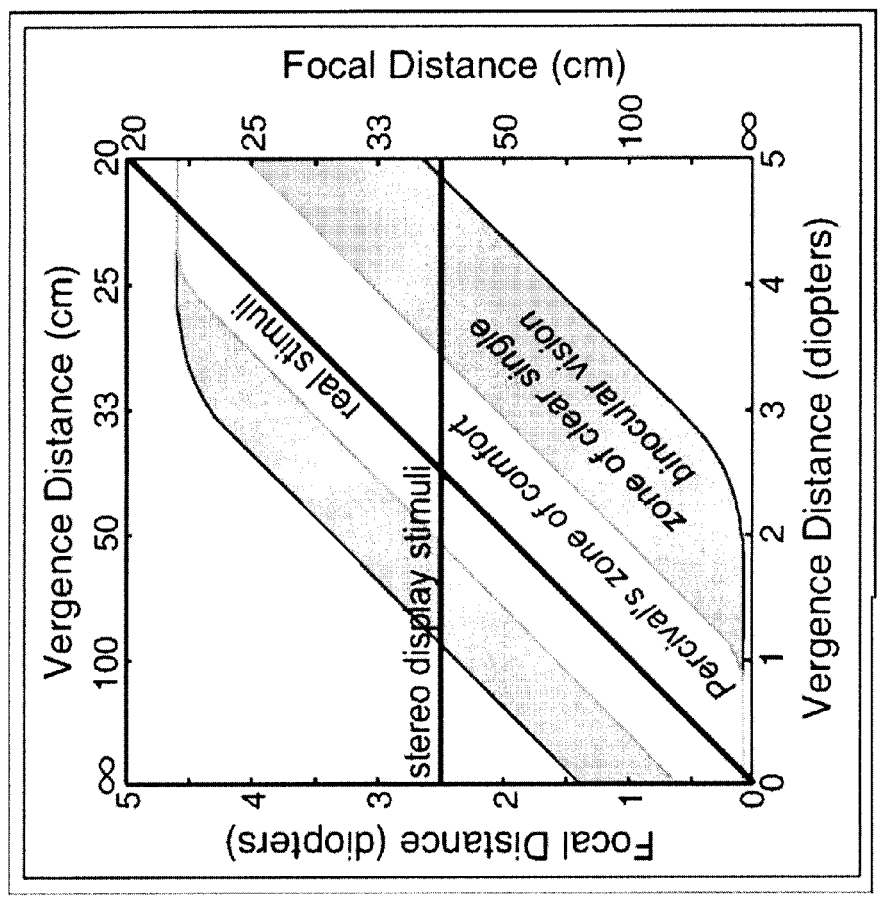
FIG. 3e is a chart illustrating an embodiment of Percival's Zone of Comfort.

In an embodiment, the depth provided by the modified stereoscopic image may be selected in order to reduce conflicts between vergence and accommodation and stay within Percival's zone of comfort, illustrated in FIG. 3d, which is the set of vergence and focal distances for which a typical viewer can see a sharply focused single image; i.e., it is the set of those distances for which vergence and accommodation can be adjusted for sufficiently well by a typical viewer. For example, as viewers get closer to the display, the depth provided may be reduced in order to reduce conflicts between vergence and accommodation, while as viewers get further from the display, the depth provided may be increased in order to maximize the illusion of 3D. In another example, as viewer interocular measurements gets smaller, the depth provided may be reduced. By using an average viewer distance and an average viewer interocular measurement (e.g., using the PMV curve) to modify each original stereoscopic image, viewing comfort may be maximized for each of the viewers 302a, 302b, 302c, 302d, and 302e.

In an embodiment, the 3D content provided by the content device 118 may include original stereoscopic images (each including an original left eye image and an original right eye image) that have been provided an original 'convergence', or pixel adjustment, to convert the 3D content from a content originally used in a theater or projection environment where viewers are located relatively far (e.g., 50-100 feet) from the 2D screen that creates the illusion of 3D, to a content appropriate for a home or television environment viewers are located relatively close (e.g., 5-10 feet) to the 2D screen that creates the illusion of 3D. The parameter application engine 206 may then 'reconverge' the original stereoscopic images by providing pixel adjustments according to the viewer information provided by the camera 116.

The method 300 then proceeds to block 308 where the modified stereoscopic images are displayed on the display 110. In an embodiment, the modified content communication engine 210 may receive the modified stereoscopic images from the parameter application engine 206 and output them to the display 110 for viewing by the viewers 302a, 302b, 302c, 302d, and 302e. Thus, a system and method are provided that allow 3D content to be modified in order to maximize the viewing comfort for one or more viewers by reducing vergence and accommodation conflicts for the viewers. The modification may be done "on-the-fly" while the original 3D content is being played, and modifications to the 3D content may be adjusted as the amounts and locations of viewers in the visible field of the camera change. In addition, while the 3D content adjustment system has been described as operating for multiple viewers, one of skill in the art will recognize that the system provides significant benefits for even a single viewer by optimizing that viewing comfort based on the viewer information for that single viewer.

Furthermore, a user interface may be provided with the content adjustment engine 200 that allows adjustment of the parameter application engine 206. For example, adjustments of the parameter application engine 206 may be used to prioritize viewing comfort and safety for children by weighting the viewer information or the averages of the viewer information for smaller viewers. Thus, in an embodiment, smaller viewer interocular measurements may be made to have more effect on the interpolated PMV curve in order to ensure viewing comfort and reduce eye strain for smaller viewers (i.e., children).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A three dimensional (3D) content adjustment system, comprising:
   a processor;
   a camera coupled to the processor; and
   a non-transitory, computer-readable medium coupled to the processor and the camera, wherein the computer-readable medium includes a content adjustment engine comprising instructions that when executed by the processor:
   receive viewer information from the camera that includes a viewer distance from the camera and a respective viewer interocular measurement;
   modify a binocular disparity of a plurality of original stereoscopic images using the viewer distance from the camera and the respective viewer interocular measurement to create a plurality of modified stereoscopic images; and
   output the plurality of modified stereoscopic images.

2. The system of claim 1, wherein the camera is a depth camera that allows the viewer distance from the camera to be determined, and wherein facial recognition technology is used on images from the camera to determine the respective viewer interocular measurement.

3. The system of claim 1, wherein the viewer information comprises a plurality of viewer distances from the camera and a plurality of respective viewer interocular measurements, each for a respective viewer visible to the camera.

4. The system of claim 3, wherein the binocular disparity of the plurality of original stereoscopic images is modified using an average of the plurality of viewer distances from the camera and the plurality of respective viewer interocular measurements.

5. The system of claim 3, wherein the binocular disparity of the plurality of original stereoscopic images is modified using the plurality of viewer distances from the camera and the plurality of respective interocular measurements, and wherein the modification of the binocular disparity of the plurality of original stereoscopic images to create the plurality of modified stereoscopic images is weighted such that smaller viewer interocular measurements have more effect on the modification than larger interocular measurements.

6. The system of claim 3, wherein the binocular disparity of the plurality of original stereoscopic images is modified using an interpolated average of the plurality of viewer distances from the camera and the plurality of respective viewer interocular measurements.

7. The system of claim 1, wherein the plurality of original stereoscopic images are received from a content device in response to the content device playing content, and wherein the viewer information is received and the modified stereoscopic images are created and output while the content device plays the content.

8. An information handling system, comprising:
   a processor;
   a display coupled to the processor;
   a camera coupled to the processor; and
   a non-transitory, computer-readable medium coupled to the processor, the display, and the camera, wherein the computer-readable medium includes a content adjustment engine comprising instructions that when executed by the processor:
   receive viewer information from the camera that includes a viewer distance from the display and a respective viewer interocular measurement;
   receive a plurality of original stereoscopic images from a content device;
   modify a binocular disparity of the plurality of original stereoscopic images using the viewer distance from the display and the respective viewer interocular measurement to create a plurality of modified stereoscopic images; and
   display the plurality of modified stereoscopic images on the display.

9. The system of claim 8, wherein the camera is a depth camera that allows the viewer distance from the display to be determined, and wherein facial recognition technology is used on images from the camera to determine the respective viewer interocular measurement.

10. The system of claim 8, wherein the viewer information comprises a plurality of viewer distances from the display and a plurality of respective viewer interocular measurements, each for a respective viewer visible to the camera.

11. The system of claim 10, wherein the binocular disparity of the plurality of original stereoscopic images is modified using an average of the plurality of viewer distances from the display and the plurality of respective viewer interocular measurements.

12. The system of claim 10, wherein the binocular disparity of the plurality of original stereoscopic images is modified using the plurality of viewer distances from the display and the plurality of respective viewer interocular measurements, and wherein the modification of the binocular disparity of the plurality of original stereoscopic images to create the plurality of modified stereoscopic images is weighted such that smaller viewer interocular measurements have more effect on the modification than larger interocular measurements.

13. The system of claim 10, wherein the binocular disparity of the plurality of original stereoscopic images is modified using an interpolated average of the plurality of viewer distances from the display and the plurality of respective viewer interocular measurements.

14. The system of claim 8, wherein the plurality of original stereoscopic images are received from the content device in response to the content device playing content, and wherein the viewer information is received and the modified stereoscopic images are created and output while the content device plays the content.

15. A method for providing three dimensional (3D) content, comprising:
   receiving viewer information from a camera that includes a viewer distance from a display and a respective viewer interocular measurement;
   receiving a plurality of original stereoscopic images from a content device;
   modifying the binocular disparity of the plurality of original stereoscopic images using the viewer distance from the display and the respective viewer interocular measurement to create a plurality of modified stereoscopic images; and
   displaying the plurality of modified stereoscopic images on a display.

16. The method of claim 15, wherein the viewer information includes a plurality of viewer distances from the display and a plurality of respective viewer interocular measurements, each for respective viewer visible to the camera.

17. The method of claim 16, wherein the binocular disparity of the plurality of original stereoscopic images is modified using the plurality of viewer distances from the display and the plurality of respective viewer interocular measurements, and wherein the modification of the binocular disparity of the plurality of original stereoscopic images to create the plurality of modified stereoscopic images is weighted such that smaller viewer interocular measurements have more effect on the modification than larger interocular measurements.

18. The method of claim 16, wherein the plurality of original stereoscopic images are received from the content device in response to the content device playing content, and wherein the viewer information is received and the modified stereoscopic images are created and output while the content device plays the content.

* * * * *